J. B. ERWIN.
Sled Propeller.

No. 199,361. Patented Jan. 22, 1878.

Witnesses:
A. H. Schattenberg
O. R. Erwin

Inventor.
Jas. B. Erwin

UNITED STATES PATENT OFFICE.

JAMES B. ERWIN, OF MILWAUKEE, WISCONSIN.

IMPROVEMENT IN SLED-PROPELLERS.

Specification forming part of Letters Patent No. 199,361, dated January 22, 1878; application filed November 19, 1877.

*To all whom it may concern:*

Be it known that I, JAMES B. ERWIN, of the city of Milwaukee, in the county of Milwaukee and State of Wisconsin, have invented certain new and useful Improvements in Sled-Propellers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
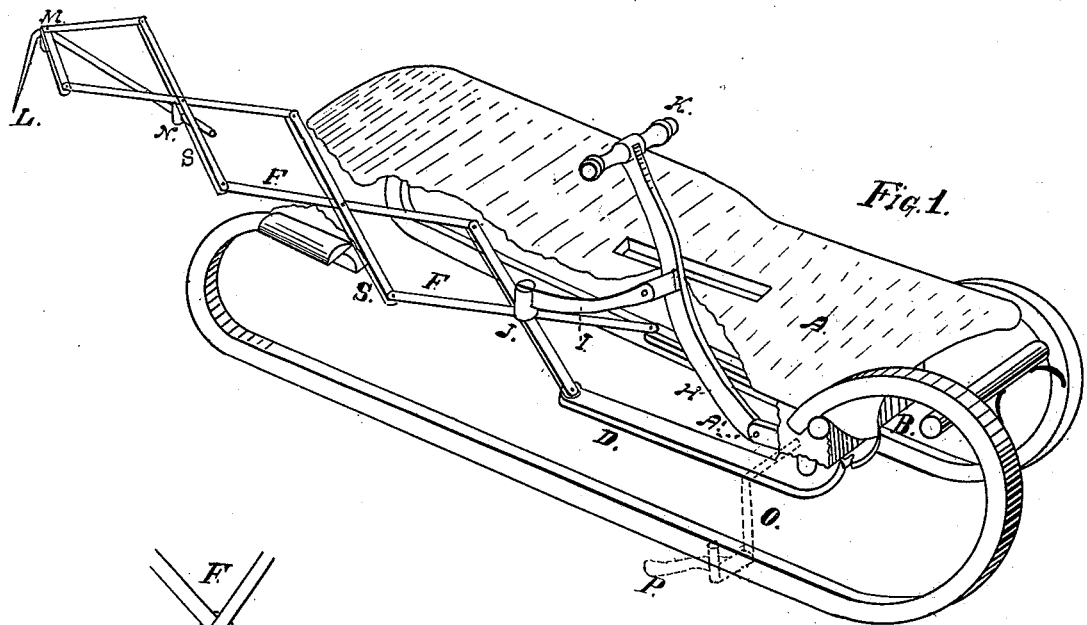
Figure 2:
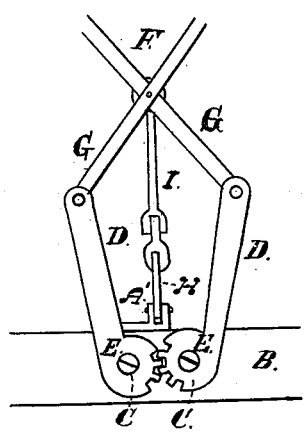

Figure 1 of the accompanying drawings represents a sectional perspective view of my invention. Fig. 2 represents a bottom sectional view of the propelling device.

The object of my invention is to furnish a device for propelling sleds and other vehicles to be operated by the person riding thereon.

In the accompanying drawings, A represents the sled, to which is secured a cross-beam, B, with bolts or their equivalent in a stationary manner. E E are gears provided with arms D D. They are attached to the cross-beam B with bolts C C, around which they perform a partial revolution forward and backward as the sled is being propelled.

F is a combination of levers, technically known as "lazy-tongs." They are attached to the arms D D, which arms serve to support and guide them. They also communicate to the arms G G of the lazy-tongs a steady and uniform movement as the lazy-tongs are extended and contracted.

The sled is propelled by the reciprocating movement of the lazy-tongs, which are operated by the lever H, from which motion is communicated to them through the bar I, which bar is attached to the lever H with a bolt, and to the lazy-tongs F by means of a slot-headed bolt, J, thus forming a joint at each end of the bar I.

The lower end of the lever H is attached with a hinge, A', to the beam B, and its upper end is provided with a handle, K, by which it is operated.

The lower end of the lazy-tongs F is provided with a sharply-pointed rod, L, which engages with the ground or ice, as the case may be, with each backward stroke of the lever H, which causes the lazy-tongs to rapidly extend themselves, and thus propel the sled forward.

The rod L is firmly secured to the lower end of the bolt M of the lazy-tongs, and extends forward past the center of the next pair of levers through the eyebolt N, which serves to keep the rod L in a rigid position relative to the lazy-tongs.

O O are supports for the feet of the operator, by means of which he is enabled to exert his powers more effectually upon the levers. The supports O are provided with metallic guiding-plates P, which are readily thrown down upon the ice by the downward pressure of the operator's heel. The friction of the plates upon the track will guide the sled toward the right or left, as desired, and will also serve as a brake to check its motion.

For the purpose of strengthening and stiffening the lazy-tongs, and also to prevent the side strain upon the bolts by which the levers are connected, the extra levers S are attached, thus giving three bearings to each bolt by which they are connected, and also by which the bolts are held at right angles to the levers.

By a forward movement of the lever H the levers of the lazy-tongs are folded together in a position nearly parallel to each other beneath the sled, while at the same time the point of the rod L is raised from the ground. When the lever H is drawn backward the point of the rod L is first driven firmly into the ground, and as the lazy-tongs continue to extend themselves the sled is propelled forward.

Having thus described my invention, what I claim as new, and desire to secure by Letters Patent, is—

1. The combination of the lazy-tongs F and rod L, operated in manner substantially as described, as a means for propelling sleds, as set forth.

2. The combination of the quadrant-gears

E E with the levers F H and bar I, for the purpose of propelling the sled, substantially as set forth.

3. The bar I, in combination with the lever H and lazy-tongs F, substantially as shown.

4. In combination with the sled A, the foot-supports O, provided with the guiding-springs P, substantially as and for the purpose specified.

In testimony that I claim the foregoing as my own I affix my signature in presence of two witnesses.

JAMES B. ERWIN.

Witnesses:
K. SHAWVAN,
CHAS. BEYER.